(12) United States Patent
Marggraff et al.

(10) Patent No.: US 8,597,511 B2
(45) Date of Patent: Dec. 3, 2013

(54) PROFILED STRIP AND SEPARATING ASSEMBLY FORMED THEREFROM

(75) Inventors: Martin Marggraff, Wuerselen (DE); Dieter Kreicha, Gomaringen (DE)

(73) Assignee: GEA 2H Water Technologies GmbH, Wettringen (DE)

(*) Notice: Subject to any disclaimer, the term of this patent is extended or adjusted under 35 U.S.C. 154(b) by 284 days.

(21) Appl. No.: 13/058,019

(22) PCT Filed: Jul. 21, 2009

(86) PCT No.: PCT/DE2009/001014
§ 371 (c)(1),
(2), (4) Date: May 9, 2011

(87) PCT Pub. No.: WO2010/017796
PCT Pub. Date: Feb. 18, 2010

(65) Prior Publication Data
US 2011/0233127 A1    Sep. 29, 2011

(30) Foreign Application Priority Data
Aug. 12, 2008 (DE) .......... 10 2008 038 698

(51) Int. Cl.
*B01D 21/28* (2006.01)
*B01D 17/028* (2006.01)
*B01D 21/00* (2006.01)
*B01D 17/02* (2006.01)

(52) U.S. Cl.
CPC ........ *B01D 21/0051* (2013.01); *B01D 21/0069* (2013.01); *B01D 17/0211* (2013.01); *B01D 2021/0078* (2013.01)

USPC .......... 210/232; 210/521; 210/541; 428/116; 428/178

(58) Field of Classification Search
USPC ................ 210/232, 521, 522, 541, 542, 802; 428/60, 116, 178
See application file for complete search history.

(56) References Cited

U.S. PATENT DOCUMENTS

| | | | | |
|---|---|---|---|---|
| 3,768,648 A | * | 10/1973 | Anderson et al. | 210/802 |
| 3,852,199 A | * | 12/1974 | Wachsmuth et al. | 210/522 |
| 3,977,977 A | * | 8/1976 | Kall | 210/521 |
| 4,122,017 A | * | 10/1978 | Tanabe et al. | 210/522 |
| 4,405,459 A | * | 9/1983 | Smith | 210/521 |
| 4,437,988 A | * | 3/1984 | James | 210/521 |
| 4,597,869 A | * | 7/1986 | Hakansson | 210/232 |
| 6,171,483 B1 | * | 1/2001 | Eden et al. | 210/521 |
| 2008/0314823 A1 | * | 12/2008 | Kulick et al. | 210/521 |

FOREIGN PATENT DOCUMENTS

| | | |
|---|---|---|
| EP | 0405169 A | 1/1991 |
| EP | 0559056 A | 9/1993 |
| GB | 1188938 B | 4/1970 |

* cited by examiner

*Primary Examiner* — Christopher Upton
(74) *Attorney, Agent, or Firm* — Andrew Wilford

(57) ABSTRACT

A profiled strip for the installation in honeycomb-like separator packages and a honeycomb-like separator package formed by a plurality of profiled strips are described. The profiled strip has two long base sides and two connection sides. It is distinguished by the fact that a single groove connection portion is respectively arranged at the free ends of the connection sides and a single tongue connection portion is respectively arranged at the ends of the base sides that abut the connection sides, or vice versa. By this, corresponding separator packages can be assembled very simple.

6 Claims, 2 Drawing Sheets

PROFILED STRIP AND SEPARATING ASSEMBLY FORMED THEREFROM

CROSS REFERENCE TO RELATED APPLICATIONS

This application is the US-national stage of PCT application PCT/DE2009/001014 filed 21 Jul. 2009, published 18 Feb. 2010 as WO2010/017796, and claiming the priority of German patent application 102008038698.7 itself filed 12 Aug. 2008.

FIELD OF THE INVENTION

The present invention is directed to a profiled strip for installation in honeycomb-like separator packages for sedimentation basins, sedimentation installations etc., the profiled strip having a trough-like shape and two long base panels or sides forming an obtuse angle with one another, each of the base sides, with the formation of an obtuse angle, merging into a short connection panel or side, the base sides merging into the connection sides with the formation of such an obtuse angle that a plurality of profiled strips is adapted to be stacked into one another, the assembled separator package is formed by octagonal honeycombs and each honeycomb is formed by four profiled strips, and groove and tongue connectors are provided at the connection sides and at the base sides for putting together the honeycomb-like separator packages.

Such profiled strips, either at the manufacturer or at the respective installation site, are put together to obtain separator packages which are installed in corresponding sewage plants. Such sewage plants are normally sedimentation basins or sedimentation installations working with gravity sedimentation. The liquid mixture which is to be separated is conducted through the honeycomb-like separator package wherein laminar flow conditions are formed which are the presupposition for every sedimentation process. Laminar flow conditions are favored by the closed channels of the honeycomb system. In order to guarantee a reliable sludge output, normally such separator packages are installed in an inclined manner with respect to a horizontal line, for example with an angle of 60°.

Water conditioning, sewage clarification, post-clarification in biological sewage plants, pre-clarification of municipal sewage, sewage clarification in industry etc. are preferred fields of application.

A profiled strip of the above-cited kind is known form EP 0 559 056 B1. This known profiled strip can be packed with a small volume and can be plugged together with other profiled strips for the formation of a stable web system. For the formation of a is honeycomb altogether four groove and tongue connectors are provided by means of which the four profiled strips forming a honeycomb are fixed to one another. For this, the individual strips are plugged together wherein the tongues are pushed into the grooves. Thereafter, the desired permanent fastening is carried out.

In order to enable the production of exceptionally stable separator packages every known profiled strip has such groove and tongue connectors at the base sides and at the connection sides which consist of two groove connectors or two tongue connectors, respectively, so that, when putting together a separator package, always two adjacent groove connectors or tongue connectors of one profiled strip are plugged together with two tongue connectors or groove connectors of the other profiled strip. Here, the respective adjacent groove or tongue connectors are in an opposed position so that, when putting together two profiled strips, the one strip has to be pushed into the other strip from the front. A lateral pushing in for mounting purposes is not possible since, as mentioned, the two adjacent groove or tongue connectors are positioned oppositely with respect to one another.

OBJECT OF THE INVENTION

It is the object of the present invention to provide a profiled strip of the above-described kind which has an especially simple structure and which can be assembled for the formation of separator packages in an especially simple manner.

SUMMARY OF THE INVENTION

According to the invention this object is achieved with a profiled strip of the cited kind wherein a single groove connectors is provided at the free end of the connection sides and a single is tongue connectors is provided at the ends of the base sides joining the connection sides or vice versa.

Surprisingly, according to the invention it was ascertained that a fixing on both sides at the connection sites of the individual profiled strips as with the prior art, according to which the fixing is formed by two facing grooves which are in engagement with two tongues facing away from one another, is no more necessary for the formation of a sufficiently stable separator package but that instead of this the connection sites can be formed by a single groove connectors in cooperation with a single tongue connectors without causing a substantial loss of stability. Moreover, this inventive solution has the great advantage that, when assembling the profiled strips for the production of separator packages, a lateral pushing-in of groove and tongue is possible and a pushing-in from the front is no more necessary. In this manner the assembling for the formation of separator packages is substantially simplified. By the fact that it is no more necessary to push in or push through some tolerances can be made smaller since the friction drag between groove and tongue has no more taken into account. Furthermore, the mounting velocity is increased.

The connection of the inventive profiled strips with one another can be carried out purely mechanically by the insertion of groove and tongue at the respective connectors. Additionally, the individual profiled strips can be also fixed to one another by means of further connection techniques, for instance by gluing or welding.

An especially preferred embodiment of the invention is characterized by the feature that every groove and tongue connectors is provided with means for the interlocking of groove and tongue. Accordingly, in this embodiment the connection between the individual profiled strips is obtained by locking means in addition to the insertion of groove and tongue in order to obtain in this manner an especially firm seat of the tongue in the groove. Such locking means are particularly used if a purely mechanical connection between the individual profiled strips is carried out. The interlocking of groove and tongue prevents that the connection can be released again in a simple manner by pulling out the tongue from the groove. With a corresponding interlocking such a separation is only possible after the exertion of a relatively large force. Of course, such an interlocking can be also carried out if additional connection techniques are used, as gluing or welding.

According to a special embodiment of the invention tongue connectors are provided at the ends of the base sides joining the connection sides. These tongue connectors have a tongue emanating from the end and extending substantially parallel with respect to the base sides. Preferably, groove connectors are provided at the free ends of the connection sides wherein these groove connectors have a groove formed by an outwardly extending side portion and a following inwardly extending side portion.

Generally, a honeycomb-like separator package is assembled in such a manner that the groove connectors of one profiled strip are engaged with tongue connectors of adjacent profiled strips. In doing so, an octagonal honeycomb is formed by the base sides of two profiled strips, the connection sides of one of these profiled strips and the connection sides of two other profiled strips. Accordingly, altogether four profiled strips take part in the construction of one honeycomb. Since the connection sites are identical and consist of a groove and a tongue connectors, respectively, the assembling to obtain a separator package is simple and, as mentioned above, is simplified by the fact that a lateral assembling is possible since always only a single connectors is present at one side.

As regards the means for interlocking groove and tongue provided according to the invention, these means are preferably formed by projections and/or depressions at the groove and tongue connectors. According to another embodiment the means for interlocking are formed by undercuts at the groove and tongue connectors. In doing this, especially one projection/one undercut is formed at a tongue and one depression/undercut is formed at the outer wall of a groove or vice versa. During assembling the corresponding tongue is pushed laterally into the corresponding groove until the depression or undercut provided at the tongue has passed the projection or corresponding undercut provided at the outer wall of the groove and the projection and depression or the undercuts are locked with one another. Dependent on the design of the means for interlocking, a separation of the profiled strips from one another can be possible with a corresponding large force or can be totally excluded.

Furthermore, the present invention is directed to a honeycomb-like separator package put together by a plurality of profiled strips of the above-cited kind according to which the individual honeycombs are octagonally formed wherein the eight sides thereof are formed by the two base sides and two connection sides of a first profiled strip, two connection sides of a second and third profiled strip and the base sides of a fourth profiled strip in parallel position with respect to the first two base sides. According to such a separator package the individual profiled strips can be connected with one another purely mechanically by plugging in groove and tongue of the corresponding groove and tongue connections. Additionally, the connection can be realized by interlocking groove and tongue of the groove and tongue connections. Furthermore, the present invention is directed to a separator package according to which the individual profiled strips are connected by means of additional connection techniques, for instance gluing or welding.

It should be still mentioned that the means for interlocking can be also formed in such a manner that a projection/an undercut is formed at a wall opposite to the tongue and a depression/an undercut is formed at the outer side of the wall portion forming the groove or vice versa.

BRIEF DESCRIPTION OF THE DRAWING

In the following, the invention is described by means of an example in connection with the drawing in detail. In the drawing.

DETAILED DESCRIPTION OF THE INVENTION

Figure 1:
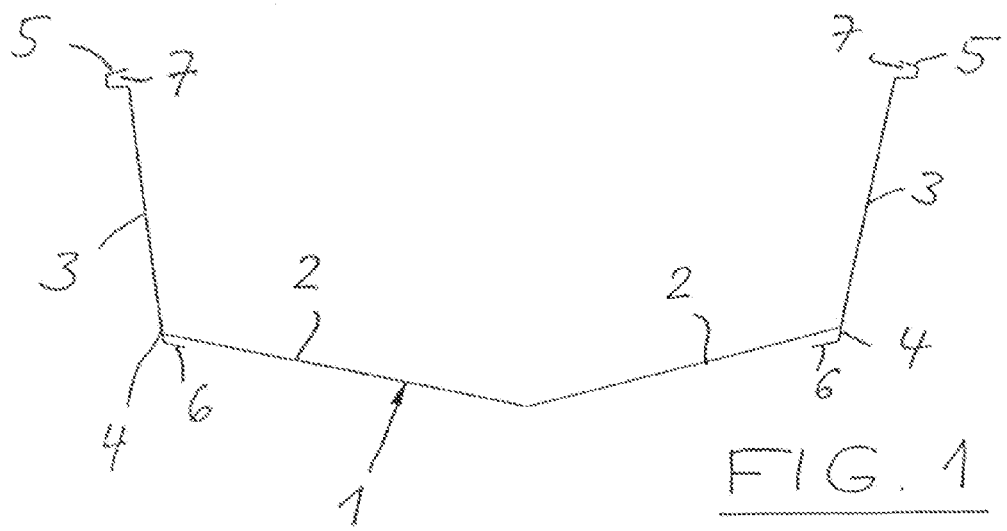
FIG. 1 is a schematic cross-section of a profiled strip.

The profiled strip shown in FIG. 1 serves for installation in a honeycomb-like separator package and has a longitudinal axis extending perpendicularly or obliquely to its front surfaces. The profiled strip 1 has two base panels or sides 2 forming with one another an obtuse angle. Each base side is joined to a respective connection panel or side 3 at an obtuse angle. The profiled strip 1 is formed in such a manner that several profiled strips can be stacked one inside the other.

Tongue connectors 4 each having a tongue 6 extending approximately parallel to the corresponding base side 2 are located at outer edges of the base sides 2 where they join the respective connection sides 3. Groove connectors 5 having grooves 7 formed by an outwardly extending side portion and a following inwardly extending side portion are located at the ends of the connection sides 3. The tongues 6 and grooves 7 are formed such that they can be inserted into one another or plugged into one another in order to form a mechanical connection between adjacent profiled strips.

Especially, suitable plastics serve as material for the profiled strip 1.

Figure 2:
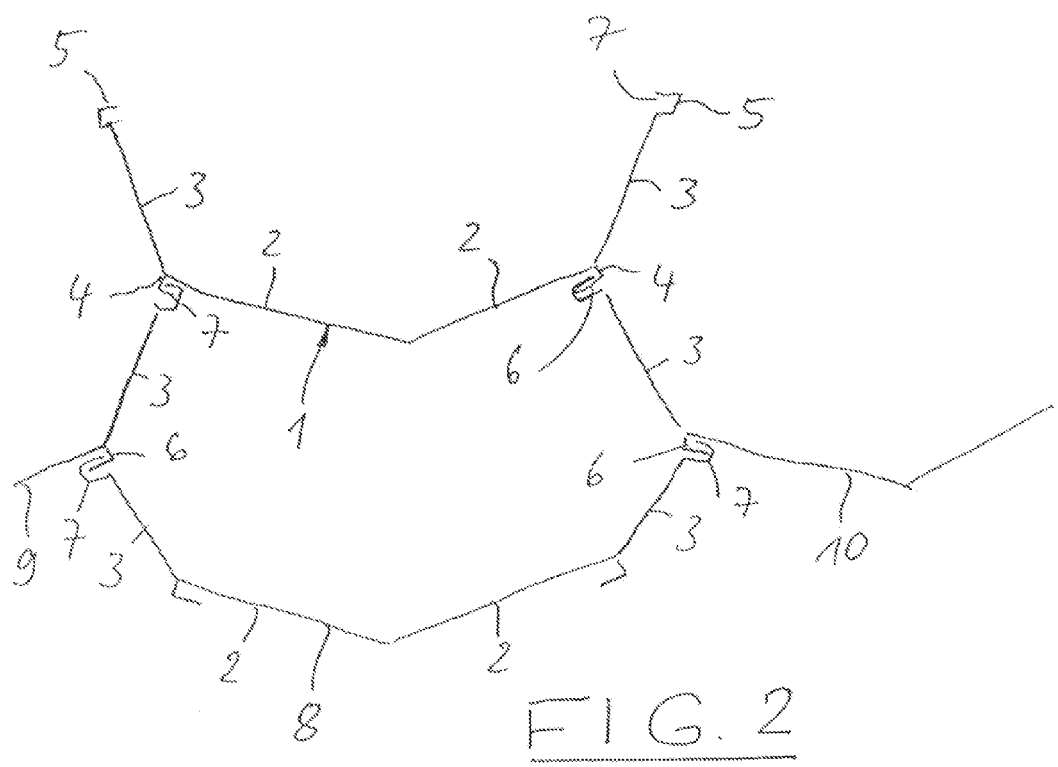
FIG. 2 is a cross-section of a part of a separator package put together by profiled strips of FIG. 1.

FIG. 2 is a schematic cross-section of a part of a separator package formed by a plurality of the profiled strips 1. In the figure altogether four profiled strips 1, 8, 9 and 10 are shown. The two base sides 2 and the two connections sides 3 of the profiled strip 8, the two base sides 2 of the profiled strips 1 and the two connection sides 3 of the profiled strips 9 and 10 form an octagonal honeycomb. The connection between the individual profiled strips is realized by plugging or inserting the respective tongues and grooves into one another. In detail, the tongues 6 at the base sides 2 of the profiled strip 1 are inserted into the grooves 5 at the connection sides 3 of the profiled strips 9 and 10 and the tongues 6 at the base sides of the profiled strips 9, 10 are inserted into the grooves 7 at the connection sides 3 of the profiled strip 8.

Figure 3:
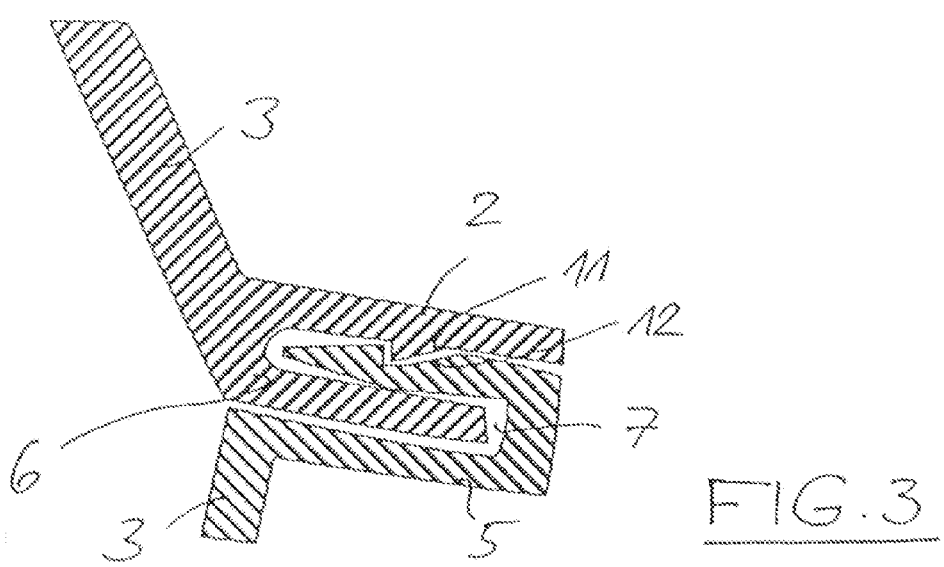
FIG. 3 is a schematic cross-section of a connection site of two profiled strips of FIGS. 1 and 2.

A corresponding connection site is shown in FIG. 3 in a larger scale. Here, the connection between a tongue 6 at a base side 2 of a profiled strip and a groove 7 at a connection side 3 of another profiled strip is shown. As shown in FIG. 3, the corresponding groove and tongue connectors is additionally provided with means for interlocking in order to enable a safe connection between groove and tongue and to prevent pulling out of the tongue from the groove. These interlocking means are formed by a projection 11 at the outer side of the base side 2 opposite to the tongue 6 and an undercut or recess 12 at the outer side of the wall portion forming the groove 7 of the connection side 3 of the other profiled strip. The embodiment shown here is only an example and can be replaced by other suitable measures.

When laterally inserting the tongue 6 into the groove 7 an interlocking (clip effect) takes place when the projecting and receding undercuts 11, 12 engage with one another.

The invention claimed is:
1. A profiled strip for formation of honeycomb separator packages for a sedimenter, the profiled strip being trough-shaped and formed of:
a pair of elongated base panels extending at an obtuse angle to each other, having joined-together inner edges, and opposite outer edges;
respective side panels extending outward from the base-panel outer edges at obtuse angles to the respective base panels and each having an outer edge; and a tongue and groove connection system consisting essentially of:

a single groove at the outer edge of each of the base panels, extending parallel to the respective base panel, and open toward the inner edge of the respective base panel; and a single tongue at the outer edge of each of the side panels, extending transverse to the respective side panel, and projecting from the respective outer edge transversely of the respective side panel such that a plurality of the strips can be joined together with each of the tongues engaged in the groove of another strip.

2. The profiled strip according to claim 1, wherein each groove and tongue is provided with means for interlocking the groove and tongue.

3. The profiled strip according to claim 2, wherein the means for interlocking are formed by projections and depressions at the grooves and tongues.

4. The profiled strip according to claim 3, wherein a projection or undercut is formed at a tongue and a depression or undercut is formed at the outer wall of a groove.

5. The profiled strip according to claim 3, wherein a projection or undercut is formed at a wall opposite to the tongue and a depression or undercut is formed at the wall portion forming the outer side of the groove.

6. The profiled strip according to claim 2, wherein the means for interlocking are formed by undercuts at the grooves and tongues.

* * * * *